(12) United States Patent
Heyn et al.

(10) Patent No.: US 8,479,895 B2
(45) Date of Patent: Jul. 9, 2013

(54) VIBRATION DAMPER WITH STROKE-DEPENDENT DAMPING FORCE

(75) Inventors: Steffen Heyn, Niederwerrn (DE); Bernd Zeissner, Volkach (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 119 days.

(21) Appl. No.: 13/049,461

(22) Filed: Mar. 16, 2011

(65) Prior Publication Data

US 2011/0226572 A1  Sep. 22, 2011

(30) Foreign Application Priority Data

Mar. 17, 2010  (DE) .......................... 10 2010 002 937

(51) Int. Cl.
*F16F 9/48* (2006.01)

(52) U.S. Cl.
USPC .................. 188/288; 188/322.15; 188/322.22

(58) Field of Classification Search
USPC .................... 188/284, 288, 316, 317, 322.13, 188/322.15, 322.18, 322.19, 322.22
See application file for complete search history.

(56) References Cited

U.S. PATENT DOCUMENTS

| 7,104,369 B2 | 9/2006 | Heyn et al. |
| 7,111,711 B2 | 9/2006 | Grundei |

FOREIGN PATENT DOCUMENTS

| DE | 103 07 363 | 9/2004 |
| DE | 103 43 875 | 4/2005 |
| EP | 1 686 284 | 8/2006 |

*Primary Examiner* — Robert A Siconolfi
*Assistant Examiner* — Vu Q Nguyen
(74) *Attorney, Agent, or Firm* — Cozen O'Connor

(57) ABSTRACT

A vibration damper with stroke-dependent damping force includes a cylinder in which a piston rod with a piston is axially movable. The piston divides the cylinder into two work spaces filled with damping medium. A bypass between the work spaces is opened or closed depending on the piston position. The piston has a damping valve for at least one through-flow direction formed by a valve body that partially covers a through-flow channel in the damping valve. The valve body has first and second pressure-actuated surfaces on opposite sides of the valve body. The action of the second pressure-actuated surface depends on the position of the piston in relation to the bypass. The first pressure-actuated surface exerts a lifting force and the second pressure-actuated surface exerts a closing force on the valve disk. The second pressure-actuated surface is connected to a control space and a connection channel that overlaps with the bypass depending on the stroke position of the piston.

7 Claims, 4 Drawing Sheets

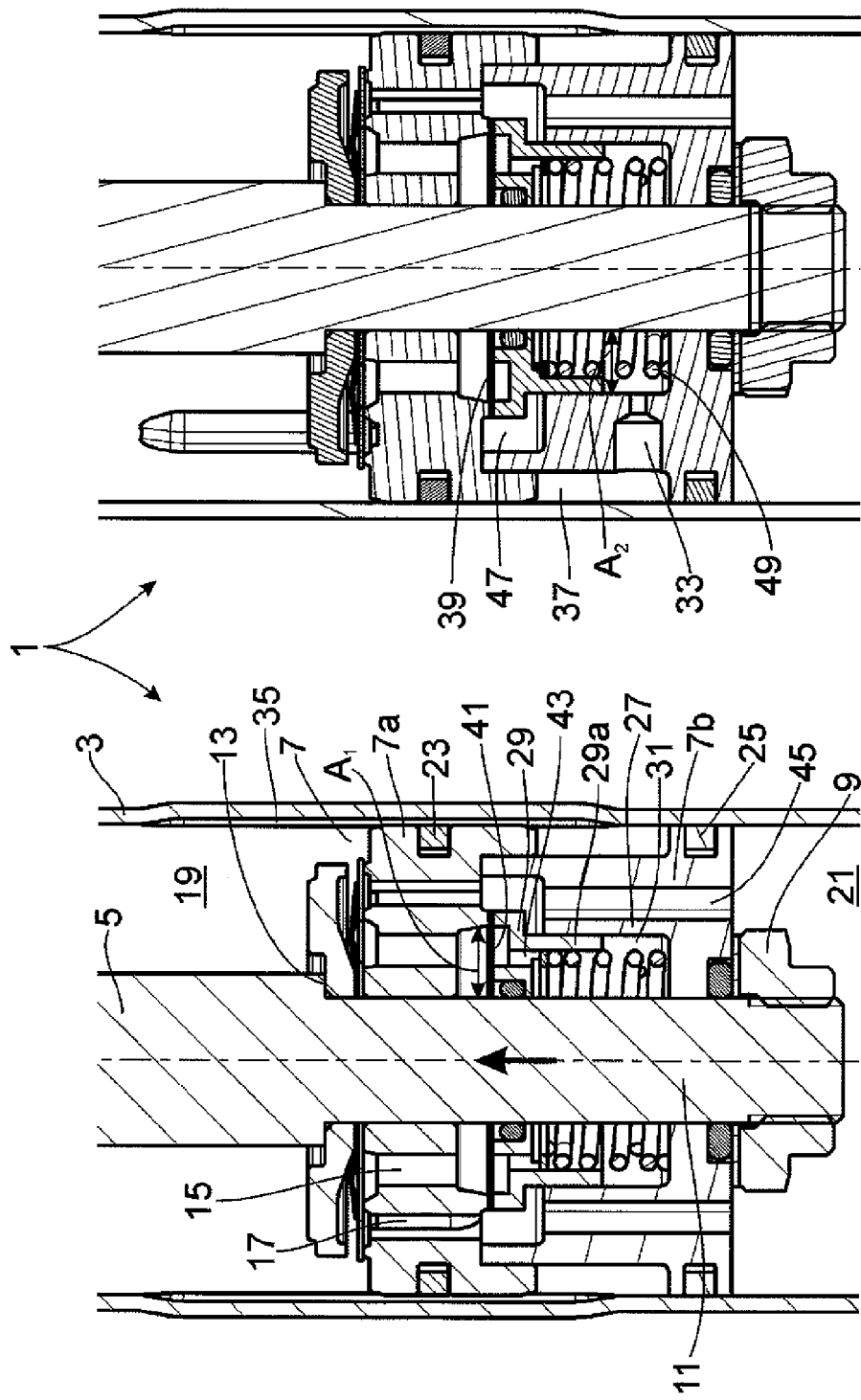

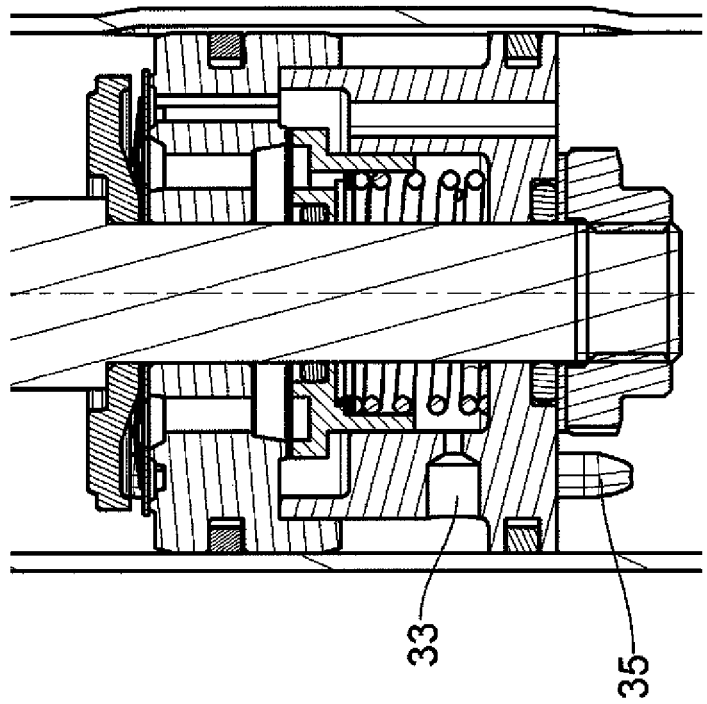
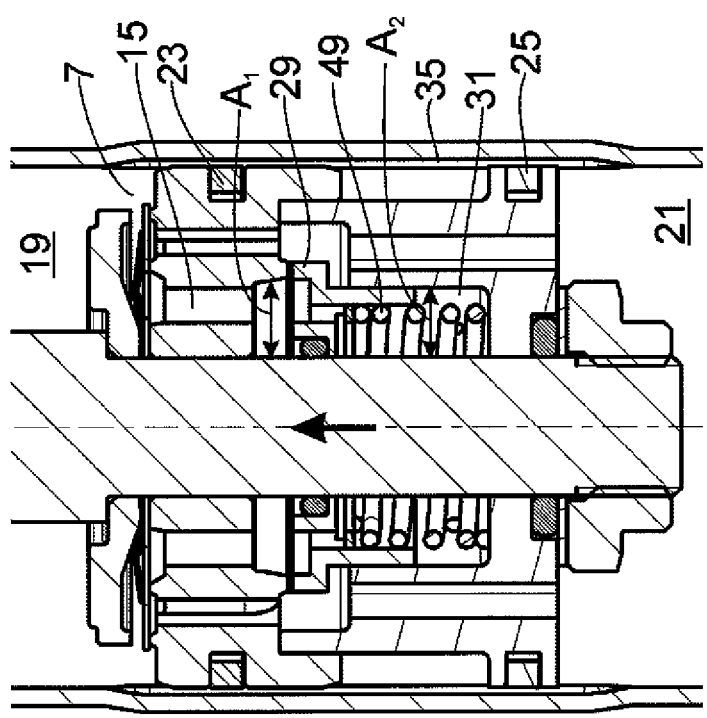

VIBRATION DAMPER WITH STROKE-DEPENDENT DAMPING FORCE

BACKGROUND OF THE INVENTION

1. Field of the Invention

The invention is directed to a vibration damper with stroke-dependent damping force.

2. Description of the Related Art

A general problem in conventional vibration dampers is the spectrum between the smallest, softest damping force and the largest, hardest damping force. Particularly in a vehicle that is only slightly loaded, the damping force is often too great because a loaded vehicle must also still be reliably controllable. In order to resolve this conflict, it has been well known for a long time to use vibration dampers with elongated grooves in the work cylinder. With less of a load, the damping medium can flow around a piston at a piston rod via a bypass and, in this way, can bring about a reduction in the damping force. However, the result that can be achieved is still not always satisfactory.

It is disclosed in DE 103 43 875 A1 that an appreciably greater range of damping force can be achieved by adding an additional pressure-actuated surface to a damping valve via the bypass groove in the work cylinder. The bypass groove serves to supply damping medium to the pressure-actuated surface at a valve disk. Inflow is blocked outside the bypass groove so that there is only one surface available at the valve disk that is continuously subject to incident flow and the damping force is defined in this way. This damping valve construction basically allows three levels of damping force. When the piston ring 11 is located outside the bypass groove 49, the vibration damper operates at the highest damping force setting. When the piston ring 11 moves inside the bypass groove, but the seal 45 moves outside the bypass groove, then a softer damping force setting is available by the inflow to the additional pressure-actuated surface at the valve disk. The softest damping force setting is achieved when both the piston ring 11 and the seal 45 are located inside the bypass groove 49.

SUMMARY OF THE INVENTION

It is an object of the present invention to provide a vibration damper with stroke-dependent damping force that has the greatest possible range of damping forces.

According to one embodiment of the invention, two pressure-actuated surfaces are constructed on opposite cover sides of at least one valve body. The first pressure-actuated surface exerts a lifting force on the valve disk and the second pressure-actuated surface exerts a closing force on the valve disk. The first pressure-actuated surface is larger than the second pressure-actuated surface and is connected to a control space, which is likewise filled with damping medium, and to a connection channel overlaps with the bypass depending on the stroke position of the piston.

The second pressure-actuated surface and, therefore, the hydraulic closing force on the valve body is operative depending on the flow of damping medium out of the control space. One advantage over the prior art cited above is that the radial space requirement is appreciably smaller because the second pressure-actuated surface and the first pressure-actuated surface are arranged on opposite cover sides. The closing force of the second pressure-actuated surface is determined by the flow of damping medium out of the control space.

For purposes of a simple construction of the damping valve, the valve body has an inflow opening to the control space.

According to one embodiment of the invention, the piston is formed of two parts, wherein one piston portion has a cup-shaped cross section and forms a receptacle for the valve body.

It is further provided that the connection channel extends radially up to the lateral surface of the piston and opens into an axial open groove. The axial length of the groove in the lateral surface can be used as adjustment parameter for the total damping force characteristic of the damping valve.

The axial open groove is formed by a reduced diameter of the piston to optimize production resources.

The valve body has a stop which determines the maximum lift position of the valve body.

Further, shared through-flow channels are used in a piston portion for both through-flow directions. Simple axial channels can be carried out. These can be produced easily and form large through-flow cross sections.

In this connection, an annular groove that can be connected to through-flow channels for both through-flow directions by the position of the valve body is advantageously constructed in a piston portion.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings:

FIGS. 1a and 1b are a vibration damper with stroke-dependent damping valve with high damping force;

FIGS. 2a and 2b are the damping valve according to FIGS. 1a, b in stroke position with minimal damping force;

DETAILED DESCRIPTION OF THE PRESENTLY PREFERRED EMBODIMENTS

Figure 3B:
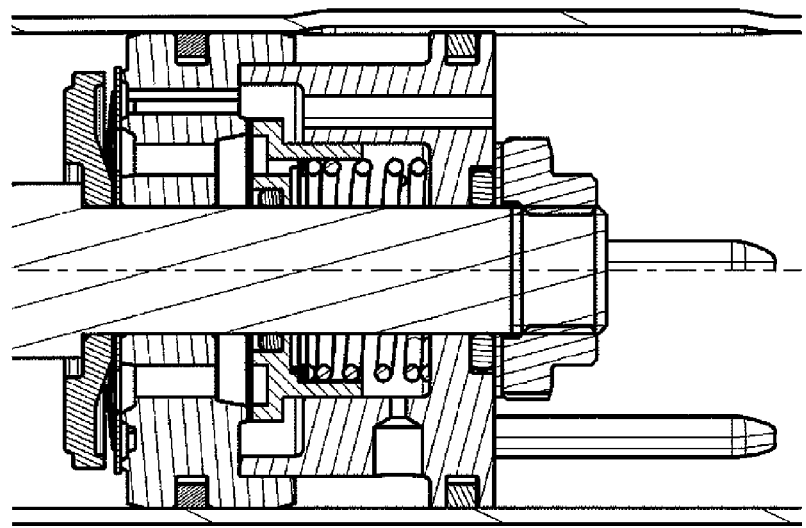
FIGS. 3a and 3b are the damping valve according to FIGS. 1a, b in stroke position with reduced damping force.

FIGS. 1a, 1b show a section from a vibration damper 1 in two different section planes. A piston rod 5 with a piston 7 is guided so as to be axially movable in a cylinder 3. In this connection, it has no bearing on the function of the invention whether the vibration damper is a monotube or a dual-tube vibration damper.

The piston 7 is constructed in two parts, both piston portions 7a, 7b being fixed by a fastening nut 9 on a piston rod pin 11 at a shoulder 13 of the piston rod 5. A first piston portion 7a has separate through-flow channels 15; 17 for two opposite flow directions of the damping medium in the piston which divides the cylinder 3 into a work space 19 on the piston rod side and a work space 21 remote of the piston rod. Both work spaces 19; 21 are completely filled with damping medium and are separated by two piston rings 23; 25 which are spaced apart, one piston ring in each piston portion 7a, 7b.

Second piston portion 7b has a cup-shaped cross section which forms a receptacle 27 for an axially movable valve body 29. The valve body 29 has a stepped outer contour, a length portion 29a with a smaller diameter being guided in the receptacle 27 so as to be sealed. An underside of the valve body 29 and the receptacle 27 of the second piston portion 7b form a control space 31 that is likewise filled with damping medium. This control space 31 is connected via a connection channel 33 to a bypass 35 in the form of at least one axial groove in the inner wall of the cylinder 3. The connection channel 33 in the piston 7 extends radially up to the lateral surface of the piston 7 and opens into an open groove 37 which is formed, for example, by a reduction in diameter of the piston 7, in this instance by a radial shoulder of the second piston portion 7b.

The valve body 29 at least partially covers an outlet opening of the at least one through-channel 15 in the first piston portion 7a. The upper side of the valve body 29 facing the first piston portion 7a forms a first pressure-actuated surface A1 that acts in the opening direction and which, owing to the stepped construction of the valve body 29, is greater than a second surface A2 that acts in the closing direction at an underside of the valve body 29 and is acted upon by the pressure in the control space 31. At least one inflow opening 41 and for 43 from the at least one through-channel 15 to the control space 31 is constructed, respectively, in a valve disk 39 and in the valve body 29 itself.

Common through-flow channels 45 for both through-flow directions are constructed in the second piston portion 7b. An annular groove 47 that can be connected to the through-flow channels 15 in the first piston portion 7a by the position of the valve body 29 is constructed at an end face of the second piston portion 7b facing in the direction of the first piston portion 7a.

FIGS. 1a, 1b show the piston 7 in a position with respect to the bypass 35 in which the piston ring 23 in the first piston portion 7a axially overlaps with the bypass 35 so that the piston ring 23 is inoperative when the piston rod moves in the direction indicated by the arrow. The piston ring 25 in the second piston portion 7b fully exercises its sealing function. Through the axial groove 37 in the lateral surface of the piston and in the connection channel 33, the instantaneous pressure prevailing in the control space 31 is comparable to the pressure in the work space 19 on the piston rod side. Further, the pressure of the damping medium continues via the through-channels 15 and inlet openings 41 and 43 in the valve disk 39 and valve body 29 into the control space 31. Consequently, while the pressure in the lifting direction on the valve body and the pressure in the closing direction of the valve body are at least approximately equal, the opening force acting on the first pressure-actuated surface A1 at the upper side of the valve body 29 is higher than the closing force acting at the underside of the valve body due to the larger cross section so that the valve body 29 is lifted from the first piston portion 7a and releases the flow path to the through-flow channels 45. The stepped construction of the valve body 29 can be used as a stop for the maximum lift position of the valve body.

The damping force setting of the damping valve is comparable to a piston position completely outside the bypass.

FIGS. 2a, 2b show the piston 7 in a stroke position in which both piston rings 23 and 25 are located inside the axial extension of the bypass 35 and, as a result, cannot exercise a complete sealing function. When the piston rod moves in the direction of the arrow, a portion of the damping medium displaced from the work space 19 on the piston rod side can flow off via the bypass 35 into the work space 21 remote of the piston rod. A portion of the damping medium flows via the inner through-flow channels 15 in the direction of the first pressure-actuated surface A1 at the valve body 29 and further, as was already described referring to FIGS. 1a, 1b, into the control space 31 which is now likewise connected to the bypass 35 via the connection channel 33, so that the pressure in the control space 31 and, therefore, at the second pressure-actuated surface A2 is appreciably lower than at the first pressure-actuated surface A1. Consequently, with a comparable piston movement against the force of a valve spring 49, a smaller lifting force is required for the valve body 28, i.e., the damping force decreases compared to the piston position shown in FIGS. 1a, 1b.

Figure 3A:
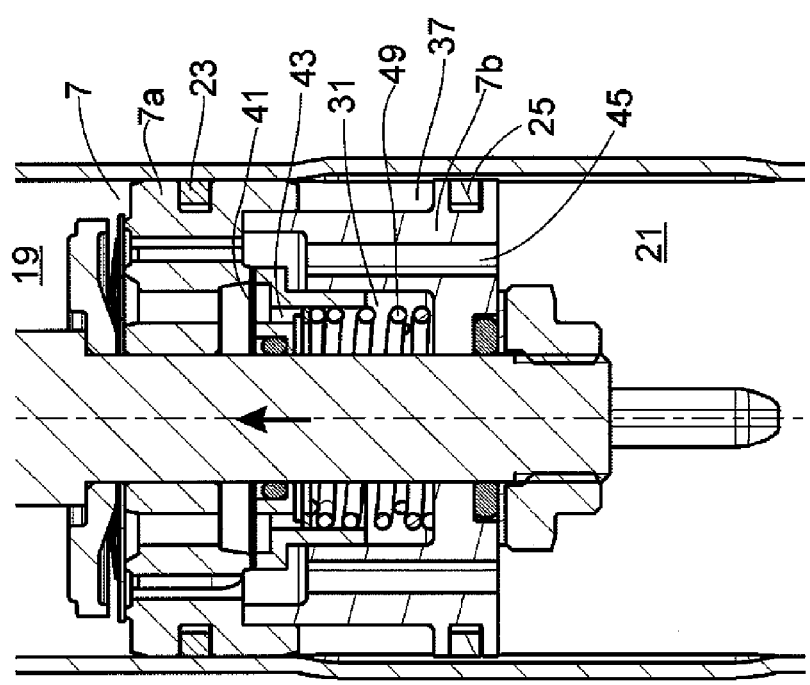

FIGS. 3a, 3b show the piston 7 in a stroke position in which the piston ring 23 in the first piston portion 7a is located axially outside the area of the bypass 35 and the piston ring 25 in the second piston portion 7b is located inside the area of the bypass 35. Compared to FIGS. 2a 2b, the damping force is even lower because, apart from a control volume flow between the upper side and the underside of the valve body 29 via the inlet openings 41 and 43, the entire flow of damping medium must take place at the lifted valve body 29. Compared to FIGS. 2a, 2b, however, a larger volume flow also flows through the inlet openings 41 and 43, i.e., the pressure gradient at the valve body 29 increases. This increased pressure gradient brings about the softest damping force setting. All of the through-channels 45 in the second piston portion 7b are available for the outlet flow. The pressure in the control space 31 is approximately at the level shown in FIGS. 2a, 2b due to the pressure gradient between the two work spaces 19; 21 because the flow of damping medium out of the control space 31 via the connection channel 33 and the groove 37 in the lateral surface of the piston 7 to the bypass 35 is guaranteed.

Figure 4B:
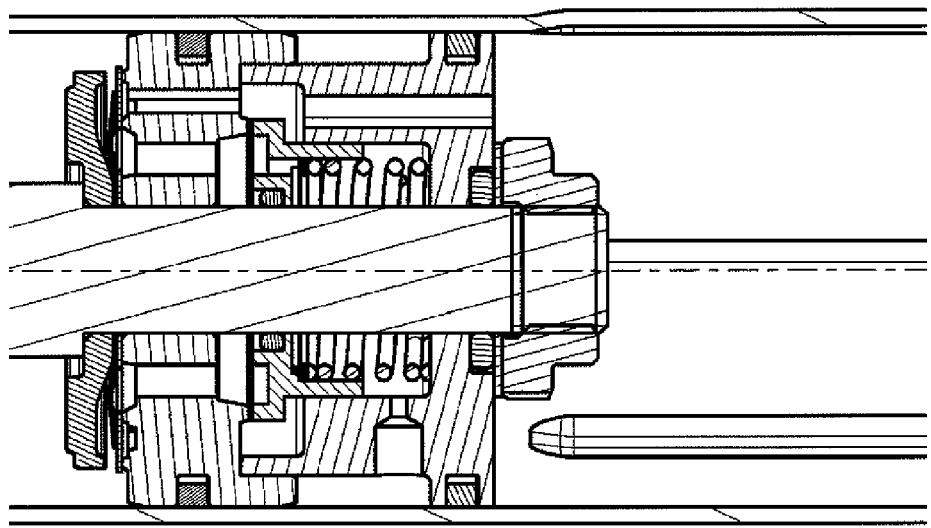
FIGS. 4a and 4b are the damping valve according to FIGS. 1a, b outside the bypass.
Figure 4A:
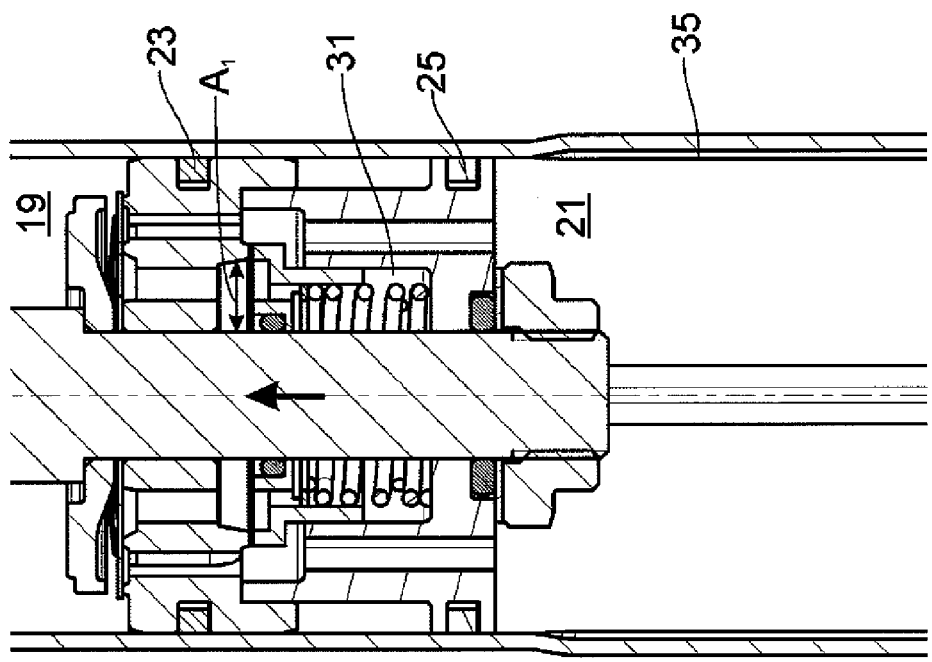

In FIGS. 4a, 4b, the piston rings 21; 23 are located outside the bypass 35 so that there can be no flow behind them. Consequently, there is also no possibility of a flow of damping medium out of the control space 31 into the work space 21 remote of the piston rod. Accordingly, the pressure in the control space 31 is comparable to that at the upper side or first pressure-actuated surface A1 of the valve body 29 so that the damping force setting of the damping valve is at its highest.

In addition to the closing force of the valve spring 49, a hydraulic damping force component which can be appreciably greater than the mechanical force of the valve spring 49 can be used with the control space 31 in connection with the pressure gradient between the first pressure-actuated surface A1 and the second pressure-actuated surface A2. Therefore, this valve spring can have a significantly smaller force compared to a valve spring in a damping valve with only one pressure-actuated surface. This reduction in force minimizes manufacturing tolerances which act in turn on the damping force tolerances of the entire damping valve.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A vibration damper with stroke-dependent damping force comprising:
    a cylinder in which a piston rod with a piston is guided so as to be axially movable, the piston dividing the cylinder into two work spaces filled with a damping medium;
    a bypass arranged between the two work spaces that is opened or closed depending on a position of the piston in the cylinder; and
    a damping valve in the piston for at least one through-flow direction, the damping valve formed by at least one valve body that at least partially covers a through-flow channel in the piston, the at least one valve body has a first pressure-actuated surface and a second pressure-actuated surface, the two pressure-actuated surfaces are constructed on opposite cover sides of the at least one valve body, the first pressure-actuated surface exerts a lifting force and the second pressure-actuated surface exerts a closing force on a valve disk,
    wherein an action of the second pressure-actuated surface depends on a position of the piston in relation to the bypass, and
    wherein the first pressure-actuated surface is larger than the second pressure-actuated surface that is connected to a control space, which is likewise filled with the damping medium, and to a connection channel that overlaps with the bypass depending on a stroke position of the piston,
    wherein the connection channel extends radially up to a lateral surface of the piston and opens into an axial open groove.

2. The vibration damper according to claim 1, wherein the valve body has an inflow opening to the control space.

3. The vibration damper according to claim 1, wherein the piston is formed of two parts, one piston portion having a cup-shaped cross section that forms a receptacle for the valve body.

4. The vibration damper according to claim 1, wherein the axial open groove is formed by a reduction in the diameter of the piston.

5. The vibration damper according to claim 1, wherein the valve body has a stop that determines a maximum lift position of the valve body.

6. The vibration damper according to claim 3, wherein shared through-flow channels are used in a second piston portion for both through-flow directions.

7. The vibration damper according to claim 6, wherein an annular groove connectable to the through-flow channels for both through-flow directions by the position of the valve body is constructed in the second piston portion.

* * * * *